July 16, 1968    E. B. SHAPIRO ETAL    3,392,845
SKIMMING DEVICE
Filed March 16, 1967
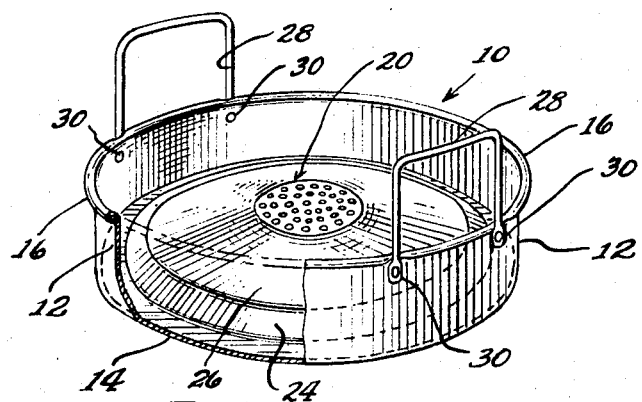
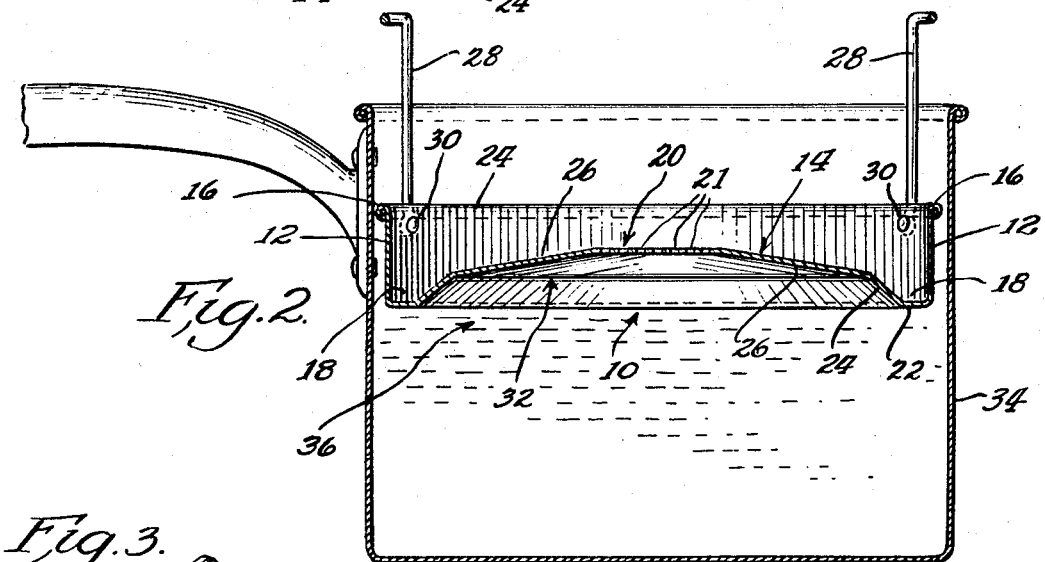
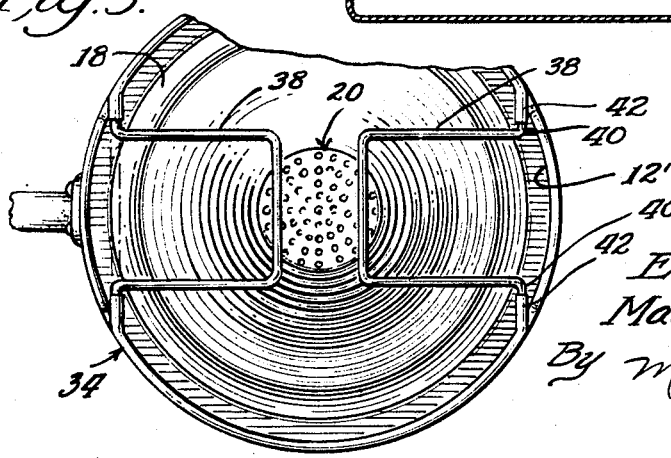
Inventors
Eugene B. Shapiro
Marlene R. Shapiro
By Max R. Kraus
Atty.

United States Patent Office 3,392,845
Patented July 16, 1968

3,392,845
SKIMMING DEVICE
Eugene B. Shapiro and Marlene R. Shapiro, both of 1870 Rosemary Road, Highland Park, Ill. 60035
Continuation-in-part of application Ser. No. 353,532, Mar. 20, 1964. This application Mar. 16, 1967, Ser. No. 638,165
4 Claims. (Cl. 210—470)

ABSTRACT OF THE DISCLOSURE

A device for skimming or removing the fat, oil, grease or fatty liquid from a liquid which contains solid material, comprising a pan-like structure with a raised central perforate portion in which the perforate portion has a plurality of relatively small or fine openings of a size to prevent solids and the like from passing upwardly through the openings but permitting the passage of the fat, oil, grease and the like as the device is pressed downwardly against the liquid and solid material contained in its container. The fats, oils and grease entering the device are thus skimmed and strained and are trapped in the device, leaving the solids with the unskimmed liquid in its container.

---

This application is a continuation in part of applicants' co-pending application Ser. No. 353,532, filed Mar. 20, 1964, now abandoned.

Background of invention and objects

This invention relates to a skimming device, such as a device for removing and/or separating the fat from liquids, such as soup or the like.

One of the objects of this invention is to provide a device which may be readily inserted into a container or vessel containing a liquid, and by slightly pressing downwardly on the device it will cause a portion of the fatty liquid to enter the device and become separated from the liquid in the container.

Another object of this invention is to provide a device for skimming and/or removing and/or separating the fat or oil from either heated or cool liquids, such as soup, gravy and the like.

Another object of this invention is to provide a device for readily skimming off and removing the fatty liquid substance from a heated liquid, such as soup or the like, merely by inserting the device into the container and applying manual pressure against the device to cause the fatty liquid substance to pass into the device and be trapped and thus separated from the rest of the liquid, after which the device may then be lifted with the trapped fatty liquid and emptied.

It is well known that in liquids such as cooked soups and the like the fatty liquid rises to the top and that a layer of fatty liquid covers the top of the liquid contents. Spoons and other ladling devices are commonly dipped into the liquid for the purpose of removing the fatty substance. This is very inefficient and time consuming and does not produce the best results. With the present invention the disadvantages inherent in the use of such prior art means are eliminated, and by a simple and inexpensive device and a simple procedure the function of removing the fatty substance from a liquid such as soup, gravy and the like can be performed.

Other objects will become apparent as this description progresses.

Description of the drawings

In the drawings:

FIGURE 1 is a perspective view of the device forming this invention.

FIGURE 2 is a sectional view showing the device inserted in a container or cooking vessel containing a liquid, such as soup, and showing the manner in which the fat is removed from the liquid, and FIGURE 3 is a top plan view of a modified construction.

Description of the preferred embodiments

Referring to FIGURES 1 and 2, the device forming this invention is designated generally by the numeral 10. It includes an annular vertical side wall 12 and a connecting bottom wall 14, all integrally formed. The side wall 12 has a turned lip to form a beaded rim 16. The bottom wall 14 is of a generally convexo-concave configuration shaped to form an annular well 18 adjacent the side wall 12 with a raised or elevated central perforate portion generally designated at 20. The bottom wall 14, more specifically, has an outer annular horizontal section 22 merging into an annular and upwardly inclined section 24 which merges into an annular upwardly inclined section 26, which in turn merges into the central horizontal perforate section 20. The section 20 is provided with a plurality of spaced relatively small and fine openings 21.

The device is provided with a pair of oppositely positioned inverted U-shaped handle members 28 which are fixedly secured as at 30 to the annular side wall 12. The underside of the device is generally concave and provides the recessed area 32 into which the liquid is forced and centered and caused to pass through the relatively small and fine perforate openings 21.

When the device 10 is used for its intended purpose it is inserted in a pot or container 34 containing the soup, gravy, or other liquid 36 to be skimmed of fat, as shown in FIGURE 2. The user holding the handle members 28 presses the device 10 downwardly against the liquid 36 which contains the fat, oil, grease or the like and such fat, oil, grease or the like in the container 34 will be forced into the concave portion or recessed area 32 of the bottom wall, and most of the liquid fat, oil, grease and the like will be forced upwardly through the central perforate section 20 and will then flow downwardly over the top of the bottom wall into the well portion 18. Bobbing the device 10 up and down several times in the container 34 against the liquid 36 will cause the fatty liquid in the container to pull into the center of the recessed area 32 and become trapped. As the device 10 is pressed downwardly against the liquid 36 the fatty liquid, oil, grease and the like passes through the relatively small and fine openings 21 and into the wall 18. Solids and other foreign material will not pass into the interior of the device through the perforate section 20 by reason of the relatively small and fine openings 21, therefore, the perforate section also serves as a strainer.

After the fatty liquid, grease, oil and the like is trapped in the annular well 18, the device can then be lifted from the container or pot 34 and the fatty liquid and the like can be emptied into a container to be salvaged or otherwise disposed of. The device is then again applied to the contents in the container in the same manner to remove any additional fatty liquid as required from the top of the liquid. This procedure can be repeated until practically all of the fatty liquid is removed or skimmed from the liquid in the container.

For best results it is preferred that the diameter of the device 10 be substantially the diameter of the container 34 so that the liquid in the container will not escape between the vertical wall 12 and the wall of the container.

The modified structure shown in FIGURE 3 is similar to that shown in FIGURES 1 and 2, except for the collapsible handles. In the FIGURE 3 embodiment the handle members, generally designated by the numeral 38, have outwardly extending ears 40 which are received in spaced sockets 42 formed on the annular vertical wall 12′. The handles 38 may be pivotally swung from a horizontal to an upright position and vice versa. In operation, the FIGURE 3 embodiment is similar to that previously described with reference to FIGURES 1 and 2. The FIGURE 3 embodiment permits the device to be stored in a minimum of space.

The invention shown herein is very inexpensive to produce and very simple and efficient in operation. It requires very little time to perform the stated function.

It will be understood that various changes and modifications may be made from the foregoing without departing from the spirit and scope of the appended claims.

What we claim and desire to secure by Letters Patent of the United States is:

1. A device for skimming or removing the fat, oil, grease, or fatty liquid from a liquid contained within a container and simultaneously straining the liquid to be removed, said device comprising, an upstanding wall and a bottom wall all integrally formed, said bottom wall having a generally concavo-convex portion providing a central hollow undersurface under said bottom wall, said generally concavo-convex portion having a center flat horizontal portion provided with a plurality of relatively small and fine openings, said bottom wall further having an annular well portion with said well portion positioned on a lower plane than the central flat horizontal perforate portion and completely surrounding the generally concavo-convex portion, said device having handle means, said device adapted when pressed downwardly against the surface of a liquid in the container to force the liquid upwardly towards the center to the undersurface of the bottom wall to occupy the hollow undersurface and then to cause the fat, oil, grease or fatty liquid to pass through the center flat horizontal perforate portion and flow downwardly and be trapped in the well portion, each of the openings in the plurality of openings in the center flat horizontal perforate portion being of a size to prevent solids and the like from passing upwardly through said openings into the device, said center flat horizontal perforate portion serving to strain the liquid passing into the device simultaneously with the skimming of the material.

2. A structure defined in claim 1 in which the device has a pair of spaced handles extending upwardly of the bottom wall.

3. A structure defined in claim 1 in which the device has a pair of collapsible handle members.

4. A structure defined in claim 1 in which the diameter of the device is substantially the diameter of the container so that when the device is pressed downwardly against the surface of the liquid containing the fatty liquid, the fatty liquid will not escape between the wall of the device and the wall of the container.

References Cited

UNITED STATES PATENTS

| 858,291 | 6/1907 | Irby | 210—470 |
| 1,048,546 | 12/1912 | Ketcham | 210—470 |
| 1,950,378 | 3/1934 | Andrews | 210—470 |
| 2,143,782 | 1/1939 | Lewy | 210—470 |
| 2,573,768 | 11/1951 | Pearsall | 210—95 |

FOREIGN PATENTS

| 305,565 | 2/1929 | Great Britain. |
| 783,822 | 10/1957 | Great Britain. |

REUBEN FRIEDMAN, *Primary Examiner.*

SAMIH N. ZAHARNA, *Examiner.*

C. DITLOW, *Assistant Examiner.*